US012656023B2

(12) United States Patent
Zhou et al.

(10) Patent No.: US 12,656,023 B2
(45) Date of Patent: Jun. 16, 2026

(54) CONTROL METHOD AND DEVICE FOR PHASE-CHANGE ENERGY STORAGE TYPE COLD AND HEAT COMBINED SUPPLY SYSTEM WITH MULTI-HEAT SOURCE HEAT PUMP

(71) Applicants: STATE GRID JIANGSU ELECTRIC POWER CO., LTD NANJING POWER SUPPLY COMPANY, Jiangsu (CN); NANJING JIANGBEI NEW AREA PUBLIC UTILITIES HOLDING GROUP CO. LTD, Jiangsu (CN)

(72) Inventors: Dongxu Zhou, Jiangsu (CN); Shengyu Gao, Jiangsu (CN); Kefei Fan, Jiangsu (CN); Jiahua Xia, Jiangsu (CN); Jing Xu, Jiangsu (CN); Lin Ma, Jiangsu (CN); Zhengdong Liang, Jiangsu (CN); Hengjun Zhou, Jiangsu (CN); Hui Wu, Jiangsu (CN); Weiya Zhang, Jiangsu (CN)

(73) Assignees: STATE GRID JIANGSU ELECTRIC POWER CO., LTD NANJING POWER SUPPLY COMPANY, Jiangsu (CN); NANJING JIANGBEI NEW AREA PUBLIC UTILITIES HOLDING GROUP CO. LTD, Jiangsu (CN)

( * ) Notice: Subject to any disclaimer, the term of this patent is extended or adjusted under 35 U.S.C. 154(b) by 360 days.

(21) Appl. No.: 18/495,760

(22) Filed: Oct. 27, 2023

(65) Prior Publication Data

US 2025/0075945 A1 Mar. 6, 2025

(30) Foreign Application Priority Data

Sep. 1, 2023 (CN) .......................... 202311127267.2

(51) Int. Cl.
*F24S 50/40* (2018.01)
*F24S 20/40* (2018.01)
*F24S 60/10* (2018.01)

(52) U.S. Cl.
CPC ............... *F24S 50/40* (2018.05); *F24S 20/40* (2018.05); *F24S 60/10* (2018.05)

(58) Field of Classification Search
CPC ............. F24S 50/40; F24S 60/10; F24S 20/40
(Continued)

(56) References Cited

U.S. PATENT DOCUMENTS 4,169,554 A * 10/1979 Camp ..................... F25B 13/00
126/610
4,242,872 A * 1/1981 Shaw .................... F24D 11/003
62/235.1
(Continued)

FOREIGN PATENT DOCUMENTS

CN 107940791 4/2018
CN 110285467 9/2019
(Continued)

*Primary Examiner* — Vivek K Shirsat
(74) *Attorney, Agent, or Firm* — JCIPRNET

(57) ABSTRACT

A control method for a phase-change energy storage type cold and heat combined supply system with a multi-heat source heat pump includes the following steps of: recording the temperature of a solar panel using solar energy as a heat source at a certain moment as $t_t$, the temperature of a water source to be taken as $t_s$, the temperature of a geothermal source as $t_d$, the temperature of an air source as $t_k$; calculating the heat storage efficiency $\zeta_s$, $\zeta_k$ and $\zeta_d$ of the phase change material under the action of solar energy-water energy, solar energy-air source and solar energy-ground source; calculating the hourly heat storage capacity of the heat pump $Q_{rb}$, comparing it with the total hourly heat consumption of the system $Q_{tol}$, and if $Q_{rb} < 1.45 Q_{tol}$, regu- (Continued)

lating the use of various heat sources through the heat storage integrated regulation system until $Q_{rb} < 1.45 Q_{tol}$.

6 Claims, 2 Drawing Sheets

(58) Field of Classification Search
　　　USPC ....................................... 126/595, 613, 618
　　　See application file for complete search history.

(56) References Cited

U.S. PATENT DOCUMENTS

| | | | | |
|---|---|---|---|---|
| 4,299,270 | A * | 11/1981 | McGrath | F28D 20/0052 |
| | | | | 165/104.31 |
| 4,406,136 | A * | 9/1983 | Picchiottino | F24D 11/003 |
| | | | | 126/643 |
| 8,701,653 | B2 * | 4/2014 | Spero | F24S 60/10 |
| | | | | 126/618 |
| 9,038,386 | B2 * | 5/2015 | De Martino | F24S 80/20 |
| | | | | 126/714 |
| 2013/0068418 | A1 * | 3/2013 | Gotland | F28D 19/00 |
| | | | | 165/45 |
| 2014/0000257 | A1 * | 1/2014 | Penev | F03G 6/121 |
| | | | | 126/714 |
| 2014/0250931 | A1 | 9/2014 | Chen et al. | |

FOREIGN PATENT DOCUMENTS

| | | |
|---|---|---|
| CN | 111140951 | 5/2020 |
| CN | 113790469 | 12/2021 |
| CN | 113932476 | 1/2022 |
| CN | 114739029 | 7/2022 |
| CN | 115127251 | 9/2022 |

* cited by examiner

CONTROL METHOD AND DEVICE FOR PHASE-CHANGE ENERGY STORAGE TYPE COLD AND HEAT COMBINED SUPPLY SYSTEM WITH MULTI-HEAT SOURCE HEAT PUMP

CROSS-REFERENCE TO RELATED APPLICATION

This application claims the priority benefit of China application serial no. 202311127267.2, filed on Sep. 1, 2023. The entirety of the above-mentioned patent application is hereby incorporated by reference herein and made a part of this specification.

TECHNICAL FIELD

The present invention relates to the technical field of optimal configuration of an energy storage system and particularly relates to a control method and device for a phase-change energy storage type cold and heat combined supply system with a multi-heat source heat pump.

BACKGROUND

The current energy consumption is huge, especially the transitional use of fossil energy, while primary energy is scarce and the environment is seriously damaged. Under the initiative of carbon peaking and carbon neutrality goals, the energy industry is gradually turning to a clean, low-carbon, and environmentally friendly type. Facing the severe challenges of huge energy consumption and environmental problems, it is urgent to actively develop energy-saving and emission-reduction technologies, explore new green renewable energy interaction modes, and promote the upgrading of the green and healthy energy industry. However, renewable energy has very strong volatility and intermittency, such as wind energy and solar energy are very vulnerable to the influence of time and place, so the degree of energy instability is high, and its rules are difficult to master, so it is very difficult to achieve the full and effective use of a single renewable energy.

As a frontier technology in the field of energy, the cold and heat combined supply system is based on the cascade utilization of energy, which integrates cooling and heating and helps to reduce the emission of pollutant gases. It is an efficient energy supply method, so it is widely used in the building energy supply of green factories and green industrial parks in various regions. The heat pump functions similarly to the water pump and can transfer heat energy stored in a low-grade heat source to a high-grade heat source, wherein the low-grade heat source includes natural air, water, soil ground heat, etc. and the high-grade heat source is heat that can be used by people, such as city heating, crop irrigation, etc. A phase change material (PCM) refers to a substance that changes the state of a substance at a constant temperature and provides latent heat. Phase-change energy storage generally refers to the use of a phase-change material to store energy with a certain device during the phase-change process and to release thermal energy when there is a need. Therefore, the combination of phase change materials and heat pumps is an efficient means of energy utilization, which is of great significance for the realization of national energy strategic transformation and new urban and rural green construction, and also provides a good opportunity for the development of the energy storage industry.

According to the search in the prior art, it is found that the Chinese application CN113790469A "a cold and heat combined supply system for a heating reactor with heat storage and peak regulation function and method for operating the same" discloses a solution which takes into account the changing characteristics of the cooling and heating load in different seasons and at different times during the day, and achieves the heat storage and peak regulation within the day and across seasons; however, the patent uses a single heat source, and has insufficient reliability in heat storage and heating, and at the same time has a complicated structure and a high control cost. The solution disclosed in the Chinese application CN114739029A "multipurpose carbon dioxide heat pump cold and heat combined supply system" is to switch an air cooler mode and an evaporator mode in the same heat exchanger so as to solve the problem of mismatch between cooling capacity and heat capacity; however, the solution uses an air-liquid as a heat storage material, and the heat storage effect is poor, and carbon dioxide has very high critical pressure and a very low critical temperature, which makes the design of system components very difficult.

The cold and heat combined supply system is one of the core technologies of the micro-energy grid. In summary, in the application of the existing technology in the micro-energy grid, there are many problems such as a single heat source, poor heat storage, poor heating effect, and poor reliability.

SUMMARY OF THE DISCLOSURE

The present invention provides a control method and device for a phase-change energy storage type cold and heat combined supply system with a multi-heat source heat pump, achieving efficient cooperation among multiple energy sources, and achieving the purpose of improving the operating efficiency of a micro-energy grid.

The present invention specifically uses the following technical solution:

A control method for a phase-change energy storage type cold and heat combined supply system with a multi-heat source heat pump, wherein heat sources of the multi-heat source heat pump includes solar energy-water energy, solar energy-air source, and solar energy-ground source, the control method comprises the following steps of:

Step a: recording the temperature of a solar panel using solar energy as a heat source at a certain moment as $t_r$, the temperature of a water source to be taken as $t_s$, the temperature of a geothermal source as $t_d$, the temperature of an air source as $t_k$, and the temperature of the phase change material before heat storage as $t_1$, the temperature of the phase change material of the heat pump system after heat storage only under the action of solar energy-water energy as $t_2$, the temperature of the phase change material of the heat pump system after heat storage only under the action of solar energy-air source as $t_3$, and the temperature of the phase change material of the heat pump system after heat storage only under the action of solar energy-ground source as $t_4$;

Step b: calculating the heat storage efficiency $\zeta_s$, $\zeta_k$ and $\zeta_d$ of the phase change material under the action of solar energy-water energy, solar energy-air source, and solar energy-ground source, specifically:

3

$$\zeta_s = \rho_1 \left| \frac{t_2 - t_1}{t_t - t_s} \right|$$

$$\zeta_k = \rho_2 \left| \frac{t_3 - t_1}{t_t - t_k} \right|$$

$$\zeta_d = \rho_3 \left| \frac{t_4 - t_1}{t_t - t_d} \right|$$

wherein, $\rho_1$, $\rho_2$ and $\rho_3$ are respectively referred to as a water source, an air source, and a geothermal source heat regulation coefficient;

Step c: calculating hourly heat storage capacity of heat pump $Q_{rb}$:

$$Q_{rb} = \zeta_s(n_s p_s Q_p) + \zeta_k(n_k p_k Q_w) + \zeta_d I_\gamma(n_d p_d Q_r) + Q_{WA}$$

In the above formula, $n_s$ is the number of water intake pipes, $p_s$ is the flow area of water collecting pipes, and $Q_p$ is the hourly heat collecting capacity of a single water tank; $n_k$ is the number of gas collecting pipes, $p_k$ is the effective gas collecting area of the gas collecting pipes, and $Q_w$ is the hourly heat collecting capacity of a single gas box; $n_d$ is the number of geothermal source collection devices, pa is the effective heat collecting area, $I_\gamma$ is the solar radiation intensity, $Q_r$ is hourly ground heat collecting capacity; $Q_{WA}$ is hourly heat output of the heat pump;

comparing the hourly heat output of the heat pump with the total hourly heat consumption of the system $Q_{trol}$, and if $Q_{rb} < 1.45\ Q_{tol}$, regulating the use of various heat sources through the heat storage integrated regulation system until $Q_{rb} \geq 1.45\ Q_{tol}$.

Furthermore, the difference adjustment coefficients $\rho_1$, $\rho_2$, and $\rho_3$ of the Step b satisfy:

$$\rho_1 = \frac{\Delta t_s}{\overline{t_s}} \cdot \frac{\Delta v_s}{\overline{v_s} + \overline{w}}$$

$$\rho_2 = \frac{\Delta t_k}{\overline{t_k}} \overline{w}\ \%$$

$$\rho_3 = \frac{\Delta t_d}{\overline{t_d}}$$

wherein, $\Delta t_s$ and $\Delta v_s$ are the temperature difference and flow rate difference of the water source within any 10 minutes, $\overline{t_s}$ and $\overline{v_s}$ are the average temperature and average flow rate of the water source within a day, and $\overline{w}$ is the average wind speed; $\Delta t_k$ is the temperature difference within any 3 hours, $\overline{t_k}$ is the average temperature within a day; $\Delta t_d$ is the geothermal temperature difference within any one hour, $\overline{t_d}$ is the average geothermal temperature within a day.

Further, in the Step c, the regulating use of various heat sources through a heat storage integrated regulation system is: in an initial state, the flow area of the water collecting pipe $p_s$, the effective gas collecting area of the gas collecting pipe $p_k$ and the effective heat collecting area of the solar panel pa are all set to ½ of the maximum value; in response to the hourly heat storage capacity $Q_{rb} < 1.45\ Q_{tol}$, comparing the magnitudes of $\zeta_s$, $\zeta_k$, and $\zeta_d$ at that time, reducing the collecting area of the heat source with the minimum heat storage efficiency to 40% of the original level, increasing the collecting area of the heat source with the maximum heat storage efficiency to 120% of the original level, and recalculating the hourly heat storage capacity $Q_{rb}$; at the same time, compared with the hourly total heat consumption of the system $Q_{tol}$, if the hourly heat storage capacity $Q_{rb}$ is still less than $1.45\ Q_{tol}$, a PID-based control algorithm is used to regulate a flow area of the water collecting pipe $p_s$, an effective gas collecting area of the gas collecting pipe $p_k$, and an effective heat collecting area of the solar panel pa, so that a heat storage of the heat pump for each hour finally satisfies the hourly heat storage capacity $Q_{rb} = 1.45\ Q_{tol}$.

Further, the PID-based control algorithm is specifically: the algorithm takes the flow area of the water collecting pipe $p_s$, the effective gas collecting area of the gas collecting pipe $p_k$, and the effective heat collecting area of the solar panel Pa as control variables and the hourly heat storage capacity Or as an output variable, and each sampling time is set to one hour, then at the $k^{th}$ hour, the difference $1.45\ Q_{tol} - Q_{rb}(k)$ between the target value of the output $1.45\ Q_{tol}$ and the heat storage capacity of the heat pump $Q_{rb}(k)$ at the $k^{th}$ hour is called deviation e(k), and continuously adjusting the magnitude of $p_s$, $p_k$, and $p_d$ by using the following formula, so that the hourly heat storage capacity of the heat pump $Q_{rb}$ is finally equal to $1.45\ Q_{tol}$ that after multiple iterations:

$$Q_{rb} = K_p e(k) + K_i \sum\nolimits_{n=0}^{k} e(n) + K_d(e(k) - e(k-1))$$

In the above formula, $K_p$ is the proportion coefficient, and taking $0.5 p_s$; $K_i$ is the integral time constant, and taking $0.7 p_k$; $K_d$ is the differential time constant, taking $0.65 p_d$ and $e(0)=0$.

Further, the phase change material is a mixed material of industrial-grade acetamide (CAS: 79-07-2) and natural renewable grease.

A control device for a phase-change energy storage type cold and heat combined supply system with a multi-heat source heat pump is configured to execute the above control method for the phase-change energy storage type cold and heat combined supply system with a multi-heat source heat pump, comprising an acquisition and detection module, a control module, a modulation algorithm module, an integrated compensation module, and a heat pump and cold and heat combined supply system;

the acquisition and detection module is configured to execute speed acquisition, temperature acquisition, and thermal energy acquisition, and transmit the acquired data to the control module; the modulation algorithm module is connected to the control module, and configured to analyze the acquired data by the acquisition and detection module and calculate to obtain the hourly heat storage capacity of the heat pump $Q_{rb}$; while the integrated compensation module is connected to the control module, and connected to the heat pump and the cold and heat combined supply system together with the control module; the operation steps are as follows:

a. making the device start to operate, and detecting various indexes of wind speed, water flow rate, air temperature, water temperature, and geothermal temperature by electric detection of the acquisition and detection module, and transmitting the data to the control module;

b. analyzing the acquired data using the control module through the modulation algorithm module, and at the same time controlling the integrated compensation module to adjust the collecting area of various types of heat sources;

c. sending a regulation instruction to the heat pump to complete optimization and control of the cold and heat combined supply system.

The present invention has the following advantageous effects:

the present invention achieves rational coordination of three heat sources through a mixed phase change material of industrial-grade acetamide and natural renewable grease and achieves maximum heat storage of a heat pump by adjusting the acquisition capacity of the other two heat sources when a certain heat source fluctuates greatly, and the method has strong anti-interference ability, simple operation, and low cost. The coordination of the heat source collecting area is realized through the PID control algorithm. The advantages of the PID algorithm are that it can quickly and stably converge to the target value of heat pump heat storage, with high control precision and strong anti-interference ability.

BRIEF DESCRIPTION OF THE DRAWINGS

In FIG. 2: 1. An acquisition and detection module; 2. A control module; 3. A modulation algorithm module; 4. An integrated compensation module; 5. Heat pump and cold and heat combined supply system.

DETAILED DESCRIPTION OF THE DISCLOSURE

The will now be made in detail to the embodiments of the present invention, examples of which are illustrated in the accompanying drawings. It is to be understood that the present invention may be embodied in other specific forms without departing from the spirit or scope of the invention. Based on the embodiments of the present invention, all other embodiments obtained by a person of ordinary skill in the art without inventive effort fall within the scope of the present invention.

Figure 1:
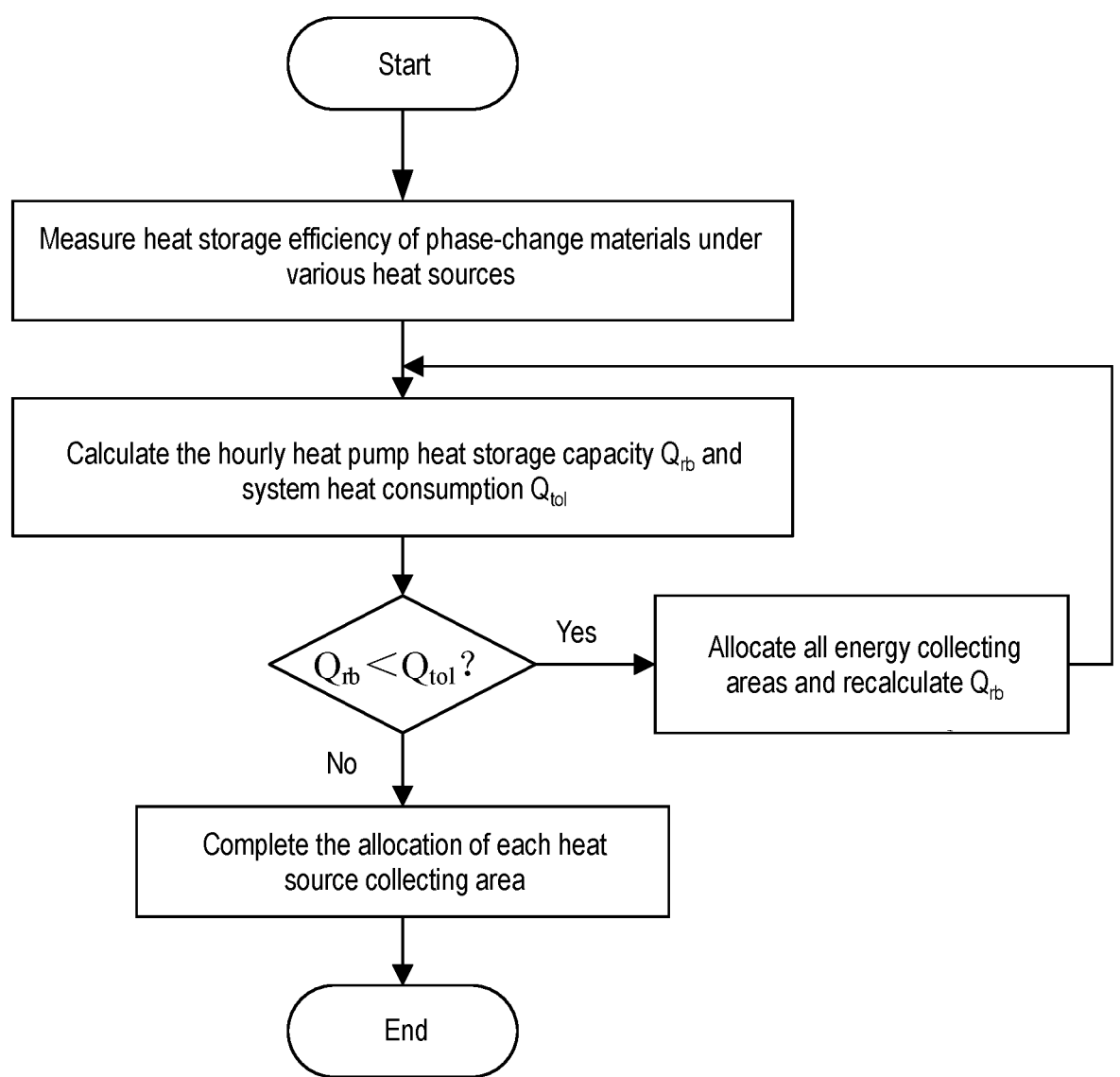
FIG. 1 is a flow chart of a control method for a phase-change energy storage type cold and heat combined supply system with a multi-heat source heat pump according to the present invention.

With reference to FIG. 1, a control method for a phase-change energy storage type cold and heat combined supply system with a multi-heat source heat pump, wherein heat sources of the multi-heat source heat pump includes solar energy-water energy, solar energy-air source and solar energy-ground source so as to achieve efficient cooperation among various energy sources and achieve the purpose of improving the operating efficiency of a micro-energy grid, the control method comprises the following steps of:

Step a: recording the temperature of a solar panel using solar energy as a heat source at a certain moment as $t_f$, the temperature of a water source to be taken as $t_s$, the temperature of a geothermal source as $t_d$, the temperature of an air source as $t_k$, and the temperature of the phase change material before heat storage as $t_1$, the temperature of the phase change material of the heat pump system after heat storage only under the action of solar energy-water energy as $t_2$, the temperature of the phase change material of the heat pump system after heat storage only under the action of solar energy-air source as $t_3$, and the temperature of the phase change material of the heat pump system after heat storage only under the action of solar energy-ground source as $t_4$; The phase change material is a mixed material of industrial-grade acetamide (CAS: 79-07-2) and natural renewable grease.

Step b: calculating the heat storage efficiency $\zeta_s$, $\zeta_k$ and $\zeta_d$ of the phase change material under the action of solar energy-water energy, solar energy-air source, and solar energy-ground source, specifically:

$$\zeta_s = \rho_1 \left| \frac{t_2 - t_1}{t_f - t_s} \right|$$

$$\zeta_k = \rho_2 \left| \frac{t_3 - t_1}{t_f - t_k} \right|$$

$$\zeta_d = \rho_3 \left| \frac{t_4 - t_1}{t_f - t_d} \right|$$

wherein, $\rho_1$, $\rho_2$ and $\rho_3$ are respectively referred to as a water source, an air source, and a geothermal source heat regulation coefficient;

The difference adjustment coefficients $\rho_1$, $\rho_2$, and $\rho_3$ satisfy:

$$\rho_1 = \frac{\Delta t_s}{\overline{t_s}} \cdot \frac{\Delta v_s}{\overline{v_s} + \overline{w}}$$

$$\rho_2 = \frac{\Delta t_k}{\overline{t_k}} \overline{w} \%$$

$$\rho_3 = \frac{\Delta t_d}{\overline{t_d}}$$

wherein, $\Delta t_s$ and $\Delta v_s$ are the temperature difference and flow rate difference of the water source within any 10 minutes, $\overline{t_s}$ and $\overline{v_s}$ are the average temperature and average flow rate of the water source within a day, and $\overline{w}$ is the average wind speed; $\Delta t_k$ is the temperature difference within any 3 hours, $\overline{t_k}$ is the average temperature within a day; $\Delta t_d$ is the geothermal temperature difference within any one hour, $\overline{t_d}$ is the average geothermal temperature within a day.

Step c: calculating hourly heat storage capacity of heat pump $Q_{rb}$:

$$Q_{rb} = \zeta_s(n_s p_s Q_p) + \zeta_k(n_k p_k Q_w) + \zeta_d I_\gamma(n_d p_d Q_r) + Q_{WA}$$

In the above formula, $n_s$ is the number of water intake pipes, $p_s$ is the flow area of water collecting pipes, and $Q_p$ is the hourly heat collecting capacity of a single water tank; $n_k$ is the number of gas collecting pipes, $p_k$ is the effective gas collecting area of the gas collecting pipes, and $Q_w$ is the hourly heat collecting capacity of a single gas box; $n_d$ is the number of geothermal source collection devices, $p_d$ is the effective heat collecting area, $I_\gamma$ is the solar radiation intensity, $Q_r$ is hourly ground heat collecting capacity; $Q_{WA}$ is hourly heat output of the heat pump;

comparing the hourly heat output of the heat pump with the total hourly heat consumption of the system $Q_{tol}$, and if $Q_{rb}<1.45\ Q_{tol}$, regulating the use of various heat sources through the heat storage integrated regulation system until $Q_{rb}>1.45\ Q_{tol}$.

In the Step c, the regulating use of various heat sources through a heat storage integrated regulation system is: in an initial state, the flow area of the water collecting pipe $p_s$, the effective gas collecting area of the gas collecting pipe $p_k$ and the effective heat collecting area of the solar panel $p_d$ are all set to ½ of the maximum value; in response to the hourly heat storage capacity $Q_{rb}$<1.45 $Q_{tol}$, comparing the magnitudes of $\zeta_s$, $\zeta_k$, and $\zeta_d$ at that time, reducing the collecting area of the heat source with the minimum heat storage efficiency to 40% of the original level, increasing the collecting area of the heat source with the maximum heat storage efficiency to 120% of the original level, and recalculating the hourly heat storage capacity $Q_{rb}$; at the same time, compared with the hourly total heat consumption of the system $Q_{tol}$, if the hourly heat storage capacity $Q_{rb}$ is still less than 1.45 $Q_{tol}$, a PID-based control algorithm is used to regulate a flow area of the water collecting pipe $p_s$, an effective gas collecting area of the gas collecting pipe $p_k$, and an effective heat collecting area of the solar panel $p_d$, so that a heat storage of the heat pump for each hour finally satisfies the hourly heat storage capacity $Q_{rb}$=1.45 $Q_{tol}$.

It should be understood that the collecting area is the flow area of the above-mentioned water collecting pipe $p_s$, the effective gas collecting area of the gas collecting pipe $p_k$, or the effective heat collecting area of the solar panel $p_d$.

The PID-based control algorithm is specifically:

the algorithm takes the flow area of the water collecting pipe $p_s$, the effective gas collecting area of the gas collecting pipe $p_k$, and the effective heat collecting area of the solar panel $p_d$ as control variables and the hourly heat storage capacity $Q_{rb}$ as an output variable, and each sampling time is set to one hour, then at the $k^{th}$ hour, the difference 1.45 $Q_{tol}$−$Q_{rb}$(k) between the target value of the output 1.45 $Q_{tol}$ and the heat storage capacity of the heat pump $Q_{rb}$(k) at the $k^{th}$ hour is called deviation e(k), and continuously adjusting the magnitude of $p_s$, $p_k$, and $p_d$ by using the following formula, so that the hourly heat storage capacity of the heat pump $Q_{rb}$ is finally equal to 1.45 $Q_{tol}$ that after multiple iterations:

$$Q_{rb} = K_p e(k) + K_i \sum\nolimits_{n=0}^{k} e(n) + K_d(e(k) - e(k-1))$$

In the above formula, $K_p$ is the proportion coefficient, and taking 0.5$p_s$; $K_i$ is the integral time constant, and taking 0.7$p_k$; $K_d$ is the differential time constant, taking 0.65$p_d$ and e (0)=0.

Figure 2:
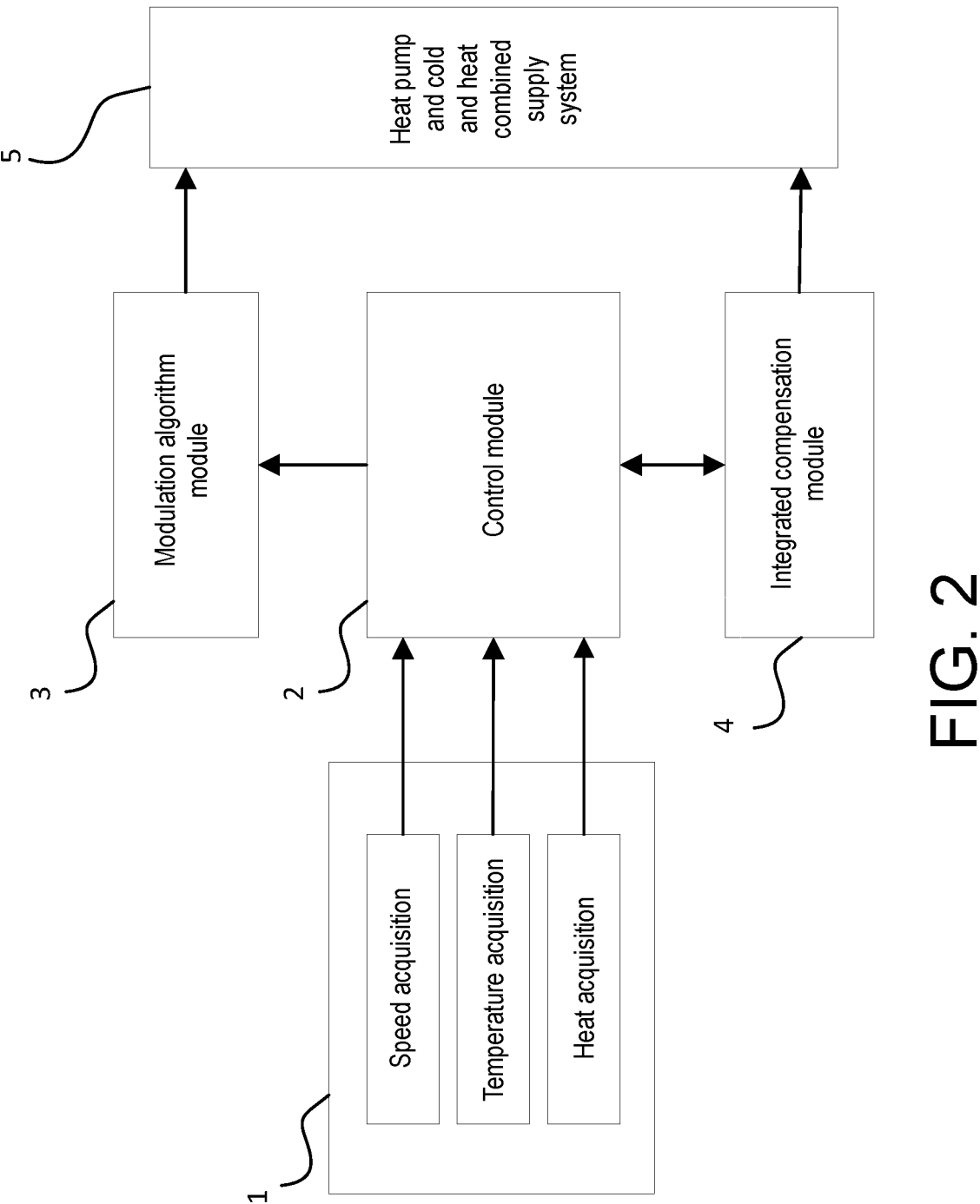
FIG. 2 is a structural diagram of a control device for a phase-change energy storage type cold and heat combined supply system with a multi-heat source heat pump according to the present invention.

With reference to FIG. 2, a control device for a phase-change energy storage type cold and heat combined supply system with a multi-heat source heat pump is configured to execute the above control method for the phase-change energy storage type cold and heat combined supply system with a multi-heat source heat pump, comprising an acquisition and detection module, a control module, a modulation algorithm module, an integrated compensation module and a heat pump and cold and heat combined supply system.

The acquisition and detection module is configured to execute speed acquisition, temperature acquisition, and thermal energy acquisition, and transmit the acquired data to the control module; the modulation algorithm module is connected to the control module, and configured to analyze the acquired data by the acquisition and detection module and calculate to obtain the hourly heat storage capacity of the heat pump $Q_{rb}$; while the integrated compensation module is connected to the control module, and connected to the heat pump and the cold and heat combined supply system together with the control module; the operation steps are as follows:

a. making the device start to operate, and detecting various indexes of wind speed, water flow rate, air temperature, water temperature, and geothermal temperature by electric detection of the acquisition and detection module, and transmitting the data to the control module;

b. analyzing the acquired data using the control module through the modulation algorithm module, and at the same time controlling the integrated compensation module to adjust the collecting area of various types of heat sources;

c. sending a regulation instruction to the heat pump to complete optimization and control of the cold and heat combined supply system.

What is claimed is:

1. A control method for a phase-change energy storage type cold and heat combined supply system with a multi-heat source heat pump, wherein the phase-change energy storage type cold and heat combined supply system comprises a solar panel, a water source, an air source, a geothermal source, and a phase change material, and wherein the multi-heat source heat pump are selected from solar energy in combination with one or more of the water source, the air source, and the geothermal source, the control method comprises the following steps of:

step a: recording the temperature of the solar panel at a certain moment as $t_t$, the temperature of the water source to be taken as $t_s$, the temperature of the geothermal source as $t_d$, the temperature of the air source as $t_k$, and the temperature of the phase change material before heat storage as $t_1$, the temperature of the phase change material of the heat pump system after heat storage only under the solar energy in combination with the water energy as $t_2$, the temperature of the phase change material of the heat pump system after heat storage only under the solar energy in combination with the air source as $t_3$, and the temperature of the phase change material of the heat pump system after heat storage only under the solar energy in combination with the ground source as $t_4$;

step b: calculating heat storage efficiencies $\zeta_s$, $\zeta_k$ and $\zeta_d$ of the phase change material respectively under the solar energy in combination with the water energy, under the solar energy in combination with the air source, and under the solar energy in combination with the ground source, specifically:

$$\zeta_s = \rho_1 \left| \frac{t_2 - t_1}{t_t - t_s} \right|$$

$$\zeta_k = \rho_2 \left| \frac{t_3 - t_1}{t_t - t_k} \right|$$

$$\zeta_d = \rho_3 \left| \frac{t_4 - t_1}{t_t - t_d} \right|$$

wherein, $\rho_1$, $\rho_2$, and $\rho_3$ are respectively referred to as a water source heat regulation coefficient, an air source heat regulation coefficient, and a geothermal source heat regulation coefficient;

step c: calculating an hourly heat storage capacity of the multi-heat source heat pump $Q_{rb}$ according to the following formula:

$$Q_{rb} = \zeta_s\left(n_s p_s Q'_p\right) + \zeta_k(n_k p_k Q'_w) + \zeta_d I_\gamma(n_d p_d Q'_r) + Q_{WA}$$

wherein $n_s$ is the number of water intake pipes, $p_s$ is a flow area per water collecting pipe, and $Q'_p$ is a normalized hourly heat collecting capacity per unit flow area for the water source; $n_k$ is the number per gas collecting pipe, $p_k$ is an effective gas collecting area of the gas collecting pipes, and $Q'_w$ is a normalized hourly heat collecting capacity per unit effective gas collecting area for the air source; $n_d$ is the number of geothermal source collection devices, $p_d$ is an effective heat collecting area per geothermal source collection device, $I_\gamma$ is a solar radiation intensity, $Q'_r$ is a normalized hourly ground heat collecting capacity per unit effective heat collecting area for the ground source; $Q_{WA}$ is an hourly heat output of the heat pump; and comparing the calculated hourly heat storage capacity of the multi-heat source heat pump $Q_{rb}$ with a total hourly heat consumption of the system $Q_{tol}$, and if $Q_{rb}$<1.45 $Q_{tol}$, regulating use of various heat sources through a heat storage integrated regulation system until $Q_{rb} \geq 1.45$ $Q_{tol}$.

2. The control method for the phase-change energy storage type cold and heat combined supply system with a multi-heat source heat pump of claim 1, wherein the difference adjustment coefficients $\rho_1$, $\rho_2$, and $\rho_3$ of the step b satisfy:

$$\rho_1 = \frac{\Delta t_s}{\bar{t}_s} \cdot \frac{\Delta v_s}{\bar{v}_s + \bar{w}}$$

$$\rho_2 = \frac{\Delta t_k}{\bar{t}_k}\bar{w}\ \%$$

$$\rho_3 = \frac{\Delta t_d}{\bar{t}_d}$$

wherein, $\Delta t_s$ and $\Delta v_s$ are a temperature difference and a flow rate difference of the water source within any 10 minutes, $\bar{t}_s$ and $\bar{v}_s$ are an average temperature and an average flow rate of the water source within a day, and $\bar{w}$ is an average wind speed; $\Delta t_k$ is a temperature difference within any 3 hours, $\bar{t}_k$ is an average temperature within a day; $\Delta t_d$ is a geothermal temperature difference within any one hour, $\bar{t}_d$ is an average geothermal temperature within a day.

3. The control method for the phase-change energy storage type cold and heat combined supply system with a multi-heat source heat pump of claim 1, wherein the regulating use of various heat sources through a heat storage integrated regulation system in the step c comprises:

setting all of the flow area of the water collecting pipe $p_s$, the effective gas collecting area of the gas collecting pipe $p_k$ and the effective heat collecting area of the solar panel $p_d$ to ½ of a maximum value in an initial state;

in response to the hourly heat storage capacity $Q_{rb}$<1.45 $Q_{tol}$, comparing the magnitudes of $\zeta_s$, $\zeta_k$, and $\zeta_d$ at that time, reducing a collecting area of a heat source with the minimum heat storage efficiency to 40% of the original level, increasing a collecting area of a heat source with the maximum heat storage efficiency to 120% of the original level, recalculating the hourly heat storage capacity $Q_{rb}$, and comparing the hourly heat storage capacity $Q_{rb}$ with the hourly total heat consumption of the system $Q_{tol}$, in response to the hourly heat storage capacity $Q_{rb}$ is still less than 1.45 $Q_{tol}$, regulating the flow area of the water collecting pipe $p_s$, the effective gas collecting area of the gas collecting pipe $p_k$, and the effective heat collecting area of the solar panel $p_d$ through a PID-based control algorithm, so that a heat storage of the heat pump for each hour finally satisfies the hourly heat storage capacity $Q_{rb}$=1.45 $Q_{tol}$.

4. The control method for the phase-change energy storage type cold and heat combined supply system with a multi-heat source heat pump of claim 3, wherein the regulating the flow area of the water collecting pipe $p_s$, the effective gas collecting area of the gas collecting pipe $p_k$, and the effective heat collecting area of the solar panel pa through PID-based control algorithm comprises:

taking the flow area of the water collecting pipe $p_s$, the effective gas collecting area of the gas collecting pipe $p_k$, and the effective heat collecting area of the solar panel $p_d$ as control variables and the hourly heat storage capacity $Q_{rb}$ as an output variable, and each sampling time is set to one hour, then at the $k^{th}$ hour, the difference 1.45 $Q_{tol}$–$Q_{rb}$(k) between a target value of the output 1.45 $Q_{tol}$ and the heat storage capacity of the heat pump $Q_{rb}$(k) at the $k^{th}$ hour is called deviation e(k), and continuously adjusting the magnitude of $p_s$, $p_k$, and $p_d$ by using the following formula, so that the hourly heat storage capacity of the heat pump $Q_{rb}$ is finally equal to 1.45 $Q_{tol}$ that after multiple iterations:

$$Q_{rb} = K_p e(k) + K_i \sum\nolimits_{n=0}^{k} e(n) + K_d(e(k) - e(k - 1));$$

wherein $K_p$ is a proportion coefficient, and taking 0.5$p_s$; $K_i$ is an integral time constant, and taking 0.7$p_k$; $K_d$ is a differential time constant, taking 0.65$p_d$ and e(0)=0.

5. The control method for the phase-change energy storage type cold and heat combined supply system with a multi-heat source heat pump of claim 1, wherein the phase change material is a mixed material of industrial-grade acetamide and natural renewable grease.

6. A control device for a phase-change energy storage type cold and heat combined supply system with a multi-heat source heat pump, being configured to execute the control method for the phase-change energy storage type cold and heat combined supply system with a multi-heat source heat pump of claim 1, comprising an acquisition and detection module, a control module, a modulation algorithm module, an integrated compensation module and a heat pump and cold and heat combined supply system, wherein the acquisition and detection module is configured to execute speed acquisition, temperature acquisition, and thermal energy acquisition, and transmit a acquired data to the control module;

wherein the modulation algorithm module is connected to the control module, and configured to analyze the acquired data by the acquisition and detection module and calculate to obtain the hourly heat storage capacity of the heat pump $Q_{rb}$;

wherein the integrated compensation module is connected to the control module, and connected to the heat pump and the cold and heat combined supply system together with the control module;

wherein the operation steps are as follows:

a. detecting various indexes of wind speed, water flow rate, air temperature, water temperature, and geothermal temperature by electric detection of the acquisition and detection module, and transmitting the data to the control module;

b. analyzing the acquired data using the control module through the modulation algorithm module, and at the same time controlling the integrated compensation module to adjust the collecting area of various types of heat sources; and c. sending a regulation instruction to the heat pump to complete optimization and control of the cold and heat combined supply system.

* * * * *